United States Patent [19]

Kawazu et al.

[11] Patent Number: 5,976,678
[45] Date of Patent: Nov. 2, 1999

[54] COLORED FILM-COVERED GLASS ARTICLES

[75] Inventors: Mitsuhiro Kawazu; Taro Miyauchi; Koichi Maeda, all of Osaka, Japan

[73] Assignee: Nippon Sheet Glass Co., Ltd., Japan

[21] Appl. No.: 08/925,393

[22] Filed: Sep. 8, 1997

Related U.S. Application Data

[63] Continuation-in-part of application No. 08/849,508, Jun. 9, 1997, abandoned.

[30] Foreign Application Priority Data

Feb. 27, 1996 [JP] Japan ..................................... 8-39226
Dec. 3, 1996 [JP] Japan ................................... 8-322476

[51] Int. Cl.⁶ ................................................... B32B 17/00
[52] U.S. Cl. ........................ 428/208; 428/328; 428/428; 428/434; 427/165; 427/168; 65/60.52
[58] Field of Search .................................. 428/328, 208, 428/428, 434; 427/165, 168; 65/60.52

[56] References Cited

U.S. PATENT DOCUMENTS

| | | | |
|---|---|---|---|
| 3,660,137 | 5/1972 | Furuuchi | 428/336 |
| 4,098,949 | 7/1978 | Kosiorek | 428/434 |
| 5,731,075 | 3/1998 | Goto | 428/323 |

*Primary Examiner*—Timothy Speer
*Attorney, Agent, or Firm*—Lorusso & Loud

[57] ABSTRACT

Colored film-covered glass articles include a glass substrate and a colored film covering the glass substrate, the colored film containing, by wt %, greater than 50 to 95 of silicon oxide, 0~30 of at least one member selected from the group consisting of zirconium oxide, tantalum oxide and titanium oxide, 0~25 of cerium oxide, 5~20 of gold as coloring fine particles as main components. The glass articles have a visible light reflectance at a side of the glass substrate not covered with the colored film is 10.0% or below. The small visible light reflectance is caused by the surface plasmon absorption of the fine particles of gold.

20 Claims, No Drawings

COLORED FILM-COVERED GLASS ARTICLES

CROSS REFERENCE TO RELATED APPLICATION

This application is a continuation-in-part of application Ser. No. 08/849,508, filed Jun. 9, 1997 for "Colored Film-Covered Glass Articles, now abandoned.

TECHNICAL FIELD

This invention relates to colored film-covered glass articles which are adapted for use as windows and mirrors of vehicles such as automobiles and buildings.

TECHNICAL BACKGROUND

The methods of making colored glass include an ion-exchange method wherein inorganic salts of silver or copper are applied onto a glass surface and calcined, so that the ultrafine particles of the inorganic salt of silver or copper are allowed to penetrate into the glass substrate, thereby causing a transparent colloidal color development, and a method wherein a metallic film is vacuum deposited on a glass substrate by use of sputtering techniques. Moreover, there is a method wherein an oxidant of a metal salt is dissolved in a metal alkoxide solution and applied onto a substrate, followed by thermal treatment to form a film of ultrafine particles of the metal.

Especially, the color development caused by the surface plasmon of the ultrafine particles of a metal has been heretofore utilized in coloration of ceramic wares because of the good heat resistance and weatherability. For instance, in accordance with J. Sol-Gel Sci. Techn. 1, 305–312 (1994), a colored film is obtained by coating an alkoxide solution of chloroauric acid and a silane on a glass substrate, and thermally treating the coating to form ultrafine particles of gold. Further, according to the invention described in Japanese Laid-open Patent Application No. 6-191896, fine particles of gold are deposited on a glass substrate by thermal decomposition to obtain a colored film composed, for example, of gold fine particles-titanium oxide-silica, with the reflectance being as excessively high as 11.7% at minimum.

On the other hand, those glasses for vehicles or buildings which have a colored film adhered thereto, such as by coating, usually exhibit a high reflectance at the glass surface, and there are known few colored film-attached glass articles of low reflectance. If the reflectance at the glass surface is high, drivers of cars running on the opposite lane become dazed, constituting a hindrance to their driving. In contrast, the glass surface of a low reflectance makes a very calm impression.

SUMMARY OF THE INVENTION

The problem which the invention is to solve is to provide colored film-covered articles having a low visible light reflectance by utilizing the surface plasmon absorption of fine particles of gold formed by thermal treatment.

In order to solve the above problem, we have developed glass articles covered with a colored film of low reflectance on which fine particles of gold are stably formed and which exhibit good long-term stability.

More particularly, the present invention provides a colored film-covered glass article which comprises a glass substrate covered on a surface thereof with a colored film which comprises, as main components and by wt %:

silicon oxide greater than 50 to 95;
at least one member selected from the group consisting of zirconium oxide, tantalum oxide and titanium oxide 0~30;
cerium oxide 0~25; and
gold as coloring fine particles 5~17, wherein the colored film has a thickness of 50 nm to 180 nm and a visible light reflectance at the side of the glass substrate opposite the side covered with the colored film is 10.0% or below.

The respective components in the composition of the colored film of the invention are described below.

Silicon oxide is necessary as a matrix material of a low reflectance, with which fine particles of gold are fixed and the ultrafine particles of gold are developed in red color. Moreover, this oxide is necessary for lowering the visible light reflectance of the film. If the content of silicon oxide is too low, the reflectance of the resultant film becomes too high or the film strength lowers. On the contrary, when the content is too great, the developed color becomes light, with a poor effect. Accordingly, the content of silicon oxide should be in the range of greater than 50 wt % to 95 wt %, preferably 55~93 wt %, calculated as $SiO_2$.

Zirconium oxide, tantalum oxide and titanium oxide may be contained in order to adjust color tone. If the amount is too great, the resultant film exhibits so high a refractive index that the reflectance becomes too high. Accordingly, the total content of zirconium oxide, tantalum oxide and titanium oxide should preferably be in the range of 0~30 wt %, more preferably 0~15 wt %.

Cerium oxide is not essential, but may be contained in the matrix to adjust color tone as is the case of zirconium oxide, tantalum oxide or titanium oxide. If the amount of cerium oxide is too great, the resultant film exhibits so high a refractive index that the reflectance of visible light becomes too high. Accordingly, the content of cerium oxide should be in the range of 0~30 wt %, calculated as $CeO_2$.

Gold is necessary for developing a bright color. If the content is too great, the durability of the resulting film lowers. On the contrary, when the content is too low, satisfactory color development is not obtained. Accordingly, the content of gold is in the range of 5~20 wt %, preferably 7~17 wt %.

With regard to the thickness of the colored film, if the thickness is too small, effective color development is not attained. On the contrary, when the thickness is too great, the film strength lowers, with a tendency of the film to become cracked. The thickness should preferably be in the range of from 50 nm to 180 nm, more preferably 60~150 nm and most preferably 80~140 nm. If the refractive index of the colored film is too high, the visible light reflectance of colored film-covered glass articles becomes high, thus giving an unfavorable appearance. Accordingly, the film composition is so controlled as to give a refractive index of 1.40~1.70, more preferably 1.40~1.60 and more preferably 1.45~1.55.

Where colored film-covered glass articles wherein a colored film is covered on one surface of a glass substrate single plate are used as a window for vehicles such as automobiles, or buildings, the usual practice is to set the article in such a way that the colored film side is on the interior side of the vehicle, i.e. the glass surface free of the colored film is on the exterior side of the vehicle (outdoor side) in order to minimize damage of the colored film. However, when the visible light reflectance of a colored film-covered glass article is too high, and especially, when the visible light reflectance at the side of the glass articles not covered with the colored film is too high, the article becomes glazed as viewed from the inside of an automobile or the outdoor side, with a poor appearance. Accordingly, the colored film composition should be so selected that the reflectance is 10.0% or below.

When the colored film of the covered glass article has a refractive index higher than a refractive index of the glass substrate, the visible light reflectance of the colored film-covered glass article wherein the colored film is formed on one surface of the glass substrate single plate (particularly, at the colored film side) increases. On the contrary, when the refractive index of the colored film is lower than the refractive index of the glass substrate, the visible light reflectance (particularly, at the colored film side) decreases.

The refractive index of a glass substrate which has a soda lime silicate composition produced according to a floating method is generally in the range of 1.51~1.52. The visible light reflectance of this glass substrate is generally in the range of 8.1~8.2% for colorless glass which is free of any colorant in the glass composition and generally in the range of 6.5~7.0% for colored glass. The colored film should preferably have a refractive index at 1.60 or below, which is higher by about 0.1 than the refractive index of the glass substrate made of the soda lime silicate composition, in order that the visible light reflectance at the glass surface side is 10.0% or below. Especially, when a colored film having a refractive index of 1.45 to 1.50 is covered, the visible light reflectance at the glass surface side can be reduced to 8% or below.

On the other hand, if the visible light reflectance as viewed from the inside of a car (from the indoor side) is too high, the field of view of a driver is disturbed especially on use in automobiles. Accordingly, the visible light reflectance as viewed from the side of the colored film of the glass plate should be as small as possible within a range of about 10% or below. The visible light reflectance from the side of the colored film can be made small by using a colored film whose refractive index is in the range of 1.60 or below, more preferably 1.45~1.50.

The colored film-covered glass article may further comprise another glass plate laminated with the colored film-covered glass substrate so that the colored film is present between the glass plate and the covered glass substrate. Further, an intermediate film composed, for example, of polyvinylbutyral, a polyester or the like may be provided between the two glass substrates. Alternatively, the two glass substrates may be laminated in such a way that they are kept away from other at a given distance between which a space is created to be filled with air, a gas or the like or the space is evacuated to provide a vacuum.

With the laminated glass laminated through an intermediate film such as polyvinylbutyral, the colored film is not in contact with any space such as of air (refractive index of about 1) but is in contact with the polyvinylbutyral (refractive index of about 1.5), so that the visible light reflectances at opposite sides of the laminated glass have little difference therebetween. In this condition, when the colored film is controlled to have such a refractive index as defined above, the visible light reflectances at the opposite sides can be made as small as 10% or below, respectively.

As the glass substrate used in the present invention, there may be used, aside from a transparent, colorless soda lime silicate glass composition, green-colored glass, bronze-colored glass, and UV-absorbing soda lime silicate glass. Besides, tempered glass, laminated glass and multi-layered glass plates may also be used.

Because the colored film of the invention does not have great UV-screening performance, it is preferred to use, as a glass substrate, a 1.5 mm~5.5 mm thick glass plate for automobiles which has a UV transmittance (T370 nm) at a wavelength of 370 nm of 10~70%, more preferably a UV transmittance determined by ISO 9050 (Tuv ISO); a value calculated by multiplying transmittances at intervals of 5 nm in the range of 377.5 nm~297.5 nm by certain weighing factors and adding the resultant products) of 15% or below, has a visible light transmittance of 40~85%, more preferably 70~85%, and has a sunlight transmittance (solar radiation transmittance) of 20~80%, more preferably 40~65%. When such a UV-absorbing glass substrate is coated, there is obtained a colored glass having high UV absorption power.

When the single glass plate covered with the colored film is laminated with another glass plate (colored or colorless) so that the colored film is turned inside to obtain a laminated glass plate or plural-layered glass plate, the colored film is further improved in weatherability. In this case, the glass substrate and the glass plate should preferably have a thickness of 1.5~2.5 mm, respectively. Preferably, the laminate of the glass substrate, not covered with the colored film and the glass plate, has a chromaticity of transmitted light expressed by a value of a of −10.0~−2.0 and a value of b of −4.0~4.0 in the Lab color system (using a C light source herein and whenever it appears hereinafter), has a UV transmittance of 0~70% (at a wavelength of 370 nm), a visible light transmittance of 70~85%, and a sunlight transmittance of 40~80%, more preferably 40~65%. It will be noted that where the intermediate film of the laminated glass is made of polyvinylbutyral having UV absorption power, the UV transmittance (at a wavelength of 370 nm) of the colored film-attached, laminated glass becomes substantially zero.

In the surface plasmon absorption which causes the coloration of fine particles of gold in the colored film of the covered glass articles of the invention, the absorption zone in a spectral absorption characteristic is shifted according to the value of the refractive index of a matrix surrounding the fine particles of gold. The colored glass articles of the invention and particularly, the colored film-covered glass plate used as a window for automobiles or buildings should preferably have, when expressed by the chromaticity of a Lab color system, transmitted light having a chromaticity ranging 5.0~10 for a and −15~6.0 for b and a lightness, L, of 20~90. More preferably, the transmitted light is such that, when expressed by the Lab color system, the chromaticity ranges −5.0~3.0 for a and −5.0~3.0 for b, and the lightness, L, ranges 40~90. Most preferably, the transmitted light has such chromaticity and lightness that a is in the range of −3.0~3.0, b is in the range of −3.0~3.0, and L is 50~90. The colored film-covered glass plate should preferably a sunlight transmittance of 55% or below. The colored film-covered glass plate should preferably have a UV transmittance (Tuv (ISO)) of 12% or below.

The colored film of the colored film-covered glass articles of the invention has transmitted light of a pink color (i.e. a transmitted light chromaticity wherein a value of a ranges 2.0~10.0 and a value of b ranges −8.0~0.0 when expressed by the Lab color system). When a green colored glass plate which has, when expressed by the Lab color system, a transmitted light chromaticity that a value of a ranges −10.0~−2.0 and a value of b ranges −4.0~4.0 and, more preferably, a value of a ranges −10.0~−4.0 and a value of b ranges −1.0~4.0 is employed as the glass substrate or its laminated glass with a glass plate, the resulting colored film-covered glass article has a neutral greyish, transmitted light color. More particularly, such a transmitted light color is expressed by such a transmitted light chromaticity that a ranges −5.0~3.0 and b ranges −5.0~3.0 when expressed according to the Lab color system, preferably by a chromaticity that a ranges −3.0~3.0 and b ranges −3.0~3.0 when expressed according to the Lab color system.

When the colored film-covered glass article is used as a window glass for automobiles, the reflected color tone as viewed from the outside of a car should preferably be close neutral grey from the standpoint of the appearance. When expressed by the Lab color system, the reflected light chromaticity should preferably be such that a ranges −5.0~3.0 and b ranges −5.0~3.0. More preferably, the chromaticity of the reflected light color is such that a ranges −4.0~2.0 and b ranges −3.0~2.0.

The fine particles of gold which contribute to coloration are obtained by coating a colored film-forming composition on a glass substrate, drying at a temperature of 100° C.~400° C. whereupon the particles are formed, and calcining at a temperature of 500° C. or above.

The starting material for silicon oxide for forming the colored film of the invention may be any one provided that it is able to form a film by a sol-gel method, which is transparent and is stronger than one obtained by other colored film-forming techniques and which exhibits good stability. The starting materials are particularly described below.

The starting materials for silicon oxide include organosilicon compounds and, preferably, metal alkoxides including, for example, tetramethoxysilane, tetraethoxysilane, tetrapropoxysilane, tetrabutoxysilane and the like. Moreover, condensates of these alkoxides (n≧2), and mixtures of the condensates are also preferably used. Examples of the condensates include hexaethoxydisiloxane (n=2), octaethoxytrisiloxane (n=3), decaethoxytetrasiloxane (n=4), ethoxypolysiloxane (n≧5) and the like.

Ethyl silicate 40 which consists of a monomer (n=1) and a condensate (n≧2) is favorably used [the composition of the silicate 40 is set out in the report of J. Cihlar, Colloids and Surfaces A: Physicochem. Eng. Aspects 70 (1993), pp. 253 to 268, and comprises, on the weight basis, 12.8 wt % of a monomer (n=1), 12.8 wt % of a dimer (n=2), 10.2 wt % of a trimer (n=3), 7.0 wt % of a tetramer, 56.2 wt % of a polymer (n≧5), and 1.8 wt % of ethanol].

Further, alkyltrialkoxysilanes wherein the alkoxy groups of the above-mentioned compounds are replaced by an alkyl group may also be used. For instance, mention is made of those compounds wherein the alkoxy group is substituted with a linear or branched alkyl group such as a methyl group, an ethyl group, a propyl group, a butyl group, a 2-ethylbutyl group, an octyl group or the like, a cycloalkyl group such as a cyclopentyl group, a cyclohexyl group or the like, an alkenyl group such as a vinyl group, an allyl group, a γ-methacryloxypropyl group, a γ-acryloxypropyl group or the like, an aryl group such as a phenyl group, a toluyl group, a xylyl group or the like, an aralkyl group such as a benzyl group, a phenethyl group or the like, or a γ-mercaptopropyl group, a γ-chloropropyl group, γ-aminopropyl group or the like.

The starting materials for titanium oxide favorably include organotitanium compounds such as titanium alkoxides, titanium acetylacetonates, titanium carboxylates and the like. The titanium alkoxides are usually represented by the formula, Ti(OR)$_4$ (wherein R represents an alkyl group having up to 4 carbon atoms). In view of their reactivity, titanium isopropoxide and titanium butoxide are preferred.

With titanium compounds, it is known that acetylacetonates are preferred from the standpoint of stability. The acetylacetonates are represented by the general formula, Ti(OR)mLn (m+n=4 and n≠0) wherein L represents acetylacetone. Titanium alkoxides may be converted to an acetylacetonate compound by reaction with acetylacetone. Alternatively, commercially available titanium acetylacetonate may be used. In addition, carboxylates may also be used.

The starting materials for zirconium oxide include zirconium tetramethoxide, zirconium tetraethoxide, zirconium tetra-iso-propoxide, zirconium tetra-n-propoxide, zirconium tetraisopropoxide-isopropanol complex, zirconium tetra-iso-butoxide, zirconium tetra-n-butoxide, zirconium tetra-sec-butoxide, zirconium tetra-t-butoxide and the like.

Alternatively, those compounds wherein the alkoxy group of the compounds represented by the general formula, Zr(OR)$_4$ (wherein R represents an alkyl group having up to 4 carbon atoms) is replaced by a halogen may be used including alkoxides of zirconium halides such as zirconium monochloride trialkoxides, zirconium dichloride dialkoxides and the like. Still alternatively, zirconium alkoxides wherein the above-mentioned zirconium alkoxides are chelated with β-keto ester compounds may be used.

Examples of the chelating agents include acetoacetic esters represented by CH$_3$COCH$_3$COOR (wherein R represents CH$_3$, C$_2$H$_5$, C$_3$H$_7$ or C$_4$H$_9$) such as methyl acetoacetonate, ethyl acetoacetonate, propyl acetoacetonate, butyl acetoacetonate and the like. Of these, alkyl acetoacetonates and, particularly, methyl acetoacetonate and ethyl acetoacetonate, are preferred in view of their availability at relatively low costs.

Although the degree of the chelating of zirconium alkoxides may be partly or wholly, the chelating is conducted such that a molar ratio of β-keto ester compound to zirconium alkoxide is 2, whereby the resultant chelated compound is stabilized. When the chelating agents other than the β-keto ester compounds, e.g. acetylacetone, are used for chelating, the resultant zirconium alkoxide which is insoluble in solvents such as alcohols precipitates. Thus, it is not possible to prepare a coating solution.

Salts of the above-mentioned zirconium alkoxides and organic acids wherein at least one alkoxy group of the zirconium alkoxides is replaced by organic acids such as acetic acid, propionic acid, butyric acid, acrylic acid, methacrylic acid, stearic acid and the like may also be used.

The starting materials for tantalum oxide preferably include tantalum alkoxides, organotantalum compounds and the like.

The starting materials for cerium oxide include organocerium compounds such as cerium alkoxides, cerium acetylacetonates and cerium carboxylates. Besides, cerium inorganic compounds may also be used such as nitrates, chlorides, sulfates and the like. In view of the stability and the ease in availability, cerium nitrates and cerium acetylacetonates are preferred.

The composition of the colored film in the practice of the invention comprises, as its main component, silicon oxide, zirconium oxide, tantalum oxide, titanium oxide, cerium oxide, and gold. Aside from these components, bismuth oxide, aluminium oxide, zinc oxide, tin oxide, indium oxide, antimony oxide, vanadium oxide, hafnium oxide may be added in amounts, for example, of 10 wt % or below in total.

Where the alkoxides are used as starting materials for silicon oxide, zirconium oxide, titanium oxide and tantalum oxide, the catalysts used for hydrolysis include inorganic acids such as hydrochloric acid, nitric acid, sulfuric acid and the like, and organic acids such as acetic acid, oxalic acid, formic acid, propionic acid, p-toluenesulfonic acid and the like.

The composition for the formation of a colored film is obtained by dissolving starting materials in solvents, respectively, and mixing the resulting solutions at given ratios.

At least one compound which has a maximum exothermic peak in a differential thermal analysis at 150° C.~250° C. may be added to the colored film-forming composition.

During the course of the thermal treatment of the composition coated on a substrate, the organosilicon compound is hydrolyzed and polycondensated to form a silica matrix. At the same time, chloroaunic acid is thermally decomposed into fine particles of gold. If the at least one compound is added, it can prevent the fine particles of gold from being expelled from the film thereby causing the particles to deposit on the film surface and not contributing to coloration. Thus, the effect on the coloration increases. When the amount of the at least one compound is controlled, the color tone can be minutely changed. For instance, when the amount is increased, the transmitted light color can be so changed that the value of a is increased while decreasing the value of b in the Lab color system. In addition, the increasing amount leads to the lowering of a visible light transmittance. In other words, the absorption peak of a spectral transmission curve caused by the fine particles of gold increases with an increasing amount and is shifted toward a longer wavelength.

Such compounds include organic materials having an ether bond and a carbon-carbon double bond in the molecule. Preferably, mention is made of acrylates, methacrylates and vinyl compounds which have an ether bond in the molecule. Most preferably, trimethylolpropane triacrylate which has six ethylene oxide units in the molecule is mentioned. The amount of the compound should preferably be 0.5~5 wt %, more preferably 0.7~4.0 wt %, based on the total amount (including that of a solvent) of the colored film-forming composition.

The type of organic solvent used in the practice of the invention depends on the film formation method. For instance, the organic solvents used for a gravure coating method, a flexographic printing method and a roll coating method should preferably be ones whose evaporation rate is low. The reason for this is that with a solvent whose evaporation rate is high, it is evaporated prior to satisfactory leveling. The evaporation rate of a solvent is generally evaluated by an evaporation rate index relative to the rate of butyl acetate which is taken as 100. Solvents having a value of 40 or below are classified as a solvent which has a very low evaporation rate. Such solvents are preferably used in gravure coating, flexographic printing and roll coating methods. For instance, mention is made of ethyl cellosolve, butyl cellosolve, cellosolve acetate, diethylene glycol monoethyl ether, hexylene glycol, diethylene glycol, tripropylene glycol, diacetone alcohol, tetrahydrofurfuryl alcohol and the like. The solvents for the coating solution used in the present invention should preferably contain at least one solvent of the type mentioned above. In order to control the viscosity and the surface tension of the coating solution, a plurality of the above-mentioned solvents may be used. Solvents whose evaporation rate is so high that a relative evaporation rate exceeds 100 and which include, for example, methanol (610), ethanol (340), n-propanol (300) and the like may be added to solvents of the above-mentioned type which have a relative evaporation rate index of 40 or below.

The coating methods used in the invention are not critical and include, for example, a spin coating method, a dip coating method, a spray coating method, a printing method and the like. Printing methods such as a gravure coating method, a flexographic printing method, a roll coating method, a screen printing method and the like are high in productivity and in use efficiency of a coating composition and are thus preferred.

The coating solution used in the present invention is applied onto a substrate according to the above-mentioned coating method and is thermally dried in an oxidative atmosphere at a temperature of 100° C.~400° C. for 5~200 minutes, followed by calcining at a temperature of 500~800° C. for 10 seconds~5 minutes, thereby forming a thin film whose thickness is 180 nm or below. A glass plate on which the coating solution has been applied and dried is subjected to masking, if necessary. Thereafter, where it is desired that the glass plate is further bent and/or subjected to thermal tempering, the film calcination may be performed in the bending and/or thermal tempering step without resorting to any separate step of film calcination.

The types and mixing ratios of silicon compound, zirconium compound, titanium compound and gold compound should be preferably determined while taking into account the miscibility with solvents and the stability, the color in an optical aspect, and the wear resistance and the chemical durability in a mechanical aspect.

The entire disclosure of Japanese Patent Application No. H8-322476 filed on Dec. 3, 1996, including specification, claims, drawings and summary are incorporated herein by reference in its entirety.

EMBODIMENTS

The invention is described in more detail by way of the following examples.

EXAMPLE 1

6 g of 0.1 N hydrochloric acid and 44 g of ethyl cellosolve were added to 50 g of ethyl silicate ("Ethyl Silicate 40" available from Colcoat Co., Ltd.), followed by agitation at room temperature for 2 hours. The resultant solution was provided as stock solution 1 for silicon oxide. This had a $SiO_2$ solid content of 20%.

Chloroauric acid tetrahydrate was dissolved in ethyl cellosolve to make a concentration of 10%, thereby providing a chloroauric acid stock solution.

2.5 g of the thus prepared silicon oxide stock solution 1 was weighed, to which 5.5 g of ethyl cellosolve was added, followed by further addition of 2 g of the chloroauric acid stock solution and mixing under agitation to prepare Coating Solution 1.

The thus prepared Coating Solution 1 was spin coated, at a frequency of 1000 rpm for 10 seconds, onto a colorless, transparent glass substrate having a thickness of 3.4 mm and a size of 10 cm×10 cm and made of a soda lime silicate composition prepared according to a floating method (refractive index=1.51, luminous transmittance (visible light transmittance), Ya, =90.0%, sunlight transmittance, Tg, =84.7%, visible light reflectance, rg, =7.4%, UV transmittance (Tuv (ISO))=76.2%, and transmitted light chromaticity of a=−0.9 and b=0.3 and reflected light chromaticity of a=−0.2 and b=0.2 when expressed by the chromaticity of the Lab color system). After drying in air, it was thermally treated at 250° C. for 2 hours to cause fine particles of gold to be deposited, followed by calcination at 720° C. for 120 seconds, thereby obtaining a glass plate bearing a colored film thereon. The visible light transmittance, the visible light reflectance (light transmitted from the side of the glass surface not covered with the colored film and from the film side), the color (transmitted light), and the like characteristics of the colored film-bearing glass plate are shown in Tables 1~3. The resultant colored film showed good results with respect to chemical resistance and abrasion resistance. It will be noted that the visible light transmittance, the visible light reflectance and the sunlight transmittance were, respectively, measured according to JIS R 3106, and the lightness and the chromaticity were, respectively, measured according to JIS Z 8729.

EXAMPLE 2

6 g of 0.1 N hydrochloric acid and 44 g of diacetone alcohol were added to 50 g of ethyl silicate ("Ethyl Silicate 40" available from Colcoat Co., Ltd.), followed by agitation at room temperature for 2 hours. The resultant solution was provided as stock solution 2 for silicon oxide. This had a $SiO_2$ solid content of 20%.

2.5 g of the thus prepared silicon oxide stock solution 2 was weighed, to which 5.5 g of ethyl cellosolve was added, followed by final addition of 2 g of the chloroauric acid stock solution used in Example 1 and mixing under agitation to prepare Coating Solution 2.

The thus prepared Coating Solution 2 was spin coated, at a frequency of 1000 rpm for 10 seconds, onto such a colorless, transparent glass substrate made of a soda lime silicate composition as used in Example 1. After drying in air, it was thermally treated at 250° C. for 2 hours to cause fine particles of gold to be deposited, followed by calcination at 720° C. for 120 seconds, thereby obtaining a glass plate bearing a colored film thereon. The visible light transmittance, visible light reflectance, color (transmitted light), and the like characteristics of the colored film are shown in Tables 1~3. The colored film showed good results with respect to the chemical resistance and the abrasion resistance.

It will be noted that on comparison of this example with Example 1, the transmitted light color was shifted toward a blue color, and this is considered owing to the change in size or shape of the fine particles of gold.

EXAMPLE 3

6 g of 0.01 N hydrochloric acid and 44 g of isopropyl alcohol were added to 50 g of methyltriethoxysilane, and agitated at room temperature for 2 hours. This solution was provided as silicon oxide stock solution 3. The solution had a $SiO_2$ solid content of 16.8%.

2 moles of acetylacetone were dropped in 1 mole of agitated titanium isopropoxide by means of a dropping funnel. The solution was provided as titanium oxide stock solution with a $TiO_2$ solid content of 16.5%.

2.06 g of the thus prepared silicon oxide stock solution 3 was provided, to which 5.01 g of isopropyl alcohol was added, followed by further addition of 0.93 g of the titanium oxide stock solution, final addition of 2 g of the chloroauric acid stock solution prepared in Example 1, and mixing under agitation to prepare Coating Solution 3.

The thus prepared coating solution 3 was coated onto a colorless, transparent glass substrate (with a size of 20 cm×40 cm) made of a soda lime silicate composition as used in Example 1 at a frequency of 1000 rpm for 10 seconds. After drying in air, it was thermally treated at 250° C. for 2 hours to cause fine particles of gold to be deposited. After keeping in an electric furnace at 720° C. for 120 seconds, the glass was removed and subjected to press molding, and immediately tempered and cooled by air to obtain a tempered glass plate for automobiles. The bent shape was as designed, and no see-through strain was observed.

The visible light transmittance, visible light reflectance, color (transmitted light) and the like characteristics of the colored film are shown in Table 1~3. The colored film showed good results with respect to chemical and abrasion resistances.

EXAMPLE 4

2.97 g of the silicon oxide stock solution 3 was provided, to which 5.0 g of isopropyl alcohol, followed by final addition of 2 g of the chloroauric acid stock solution as used in Example 1 and mixing under agitation to obtain Coating Solution 4.

The thus prepared Coating Solution 4 was spin coated, at a frequency of 1000 rpm for 10 seconds, onto a green glass substrate having a thickness of 3.4 mm and a size of 10 cm×10 cm (glass composition (wt %); $SiO_2$=71.0, $Al_2O_3$=1.53, $Fe_2O_3$=0.52, CaO=8.62, MgO=4.06, $Na_2O$=12.3, $K_2O$=0.76, refractive index=1.51, luminous transmittance (visible light transmittance), Ya, =81.2%, sunlight transmittance, Tg, =60.9%, visible light reflectance, rg, =7.1%, UV transmittance (T370 nm)=62.5%, UV transmittance (Tuv (ISO))=31.4%, transmitted light color=light green, and transmitted light chromaticity of a=−4.7, b=0.9 and transmitted light lightness L=91, and reflected light chromaticity of a=−1.3 and b=0.2 when expressed by the chromaticity of the Lab color system). After drying in air, it was thermally treated at 250° C. for 2 hours to cause fine particles of gold to be deposited, followed by calcination at 720° C. for 120 seconds, thereby obtaining a glass plate bearing a colored film thereon. The visible light transmittance, the visible light reflectance, the color (transmitted light), and the like characteristics of the colored film-bearing glass plate are shown in Tables 1~3. The resultant colored film showed good results with respect to chemical resistance and abrasion resistance.

TABLE 1

| | Film Composition | | | Refractive | |
|---|---|---|---|---|---|
| Example No. | $SiO_2$ | $TiO_2$ | Au | Index | Thickness |
| 1 | 84.0 | 0.0 | 16.0 | 1.48 | 120 nm |
| 2 | 84.0 | 0.0 | 16.0 | 1.48 | 103 nm |
| 3 | 57.1 | 26.9 | 16.0 | 1.65 | 140 nm |
| 4 | 84.0 | 0.0 | 16.0 | 1.48 | 120 nm |

TABLE 2

| Example No. | Ya (%) | Tg (%) | Transmitted Light Color | Chromaticity and Lightness of Transmitted Light (a/b/L) | Reflectance at Glass Surface Side (%) |
|---|---|---|---|---|---|
| 1 | 76.41 | 78.25 | pink | 7.13/−3.29/86.8 | 7.77 |
| 2 | 67.74 | 75.89 | reddish purple | 9.21/−7.8/81.8 | 7.83 |
| 3 | 59.41 | 70.90 | reddish purple | 10.70/−12.26/76.8 | 9.69 |
| 4 | 68.91 | 57.07 | red | 5.71/−1.46/82.5 | 6.34 |

TABLE 3

| Example No. | Chromaticity and Lightness of Reflected Light at Glass Surface Side (a/b/L) | Reflectance at Film Surface Side (%) | Chromaticity and Lightness of Reflected Light at Film Surface Side (a/b/L) |
|---|---|---|---|
| 1 | 1.48/0.76/26.8 | 7.24 | 3.52/1.17/26.4 |
| 2 | 0.37/1.43/27.8 | 5.05 | 5.99/−4.25/22.1 |
| 3 | 2.24/4.93/30.5 | 6.00 | 8.66/−1.56/23.6 |
| 4 | −0.23/0.42/25.2 | 5.53 | 1.38/−2.51/23.5 |

COMPARATIVE EXAMPLE 1

From the stock solutions of Example 3, 3.03 g of the titania stock solution was weighed as a coating solution and 4.97 g of ethyl cellosolve was weighed, to which 2.0 g of a solution of chloroauric acid tetrahydrate in ethyl cellosolve was finally added, followed by mixing under agitation to obtain Coating Solution 5.

The Coating Solution 5 was applied, dried in air and thermally treated in the same manner as in Example 1. The characteristics of the resulting glass plate are shown in Table 4~6. The resultant colored film assumed a blue color and the visible light reflectance at the glass surface was found to be as high as 19.1%.

COMPARATIVE EXAMPLE 2

From the stock solutions of Example 1, 0.50 g of the silica stock solution and 2.42 g of the titania stock solution were weighed as coating solutions, and 5.08 g of ethyl cellosolve was also weighed, to which 2.0 g of an ethyl cellosolve solution of chloroauric acid tetrahydrate was added, followed by mixing under agitation to obtain Coating Solution 6.

The thus obtained Coating Solution 6 was applied, dried in air and thermally treated in the same manner as in Example 1. The characteristics of the resulting glass plate are shown in Table 4~6. The resultant colored film assumed a blue color and the visible light reflectance at the glass surface was found to be as high as 14.7%.

COMPARATIVE EXAMPLE 3

From the stock solutions of Example 3, 1.28 g of the silica stock solution and 1.73 g of the titania stock solution were weighed as coating solutions, and 4.99 g of ethyl cellosolve was also weighed, to which 2.0 g of an ethyl cellosolve solution of chloroauric acid tetrahydrate was added, followed by mixing under agitation to obtain Coating Solution 7.

The thus obtained Coating Solution 7 was applied, dried in air and thermally treated in the same manner as in Example 1. The characteristics of the resulting glass plate are shown in Table 4~6. The resultant colored film assumed a purple color and the visible light reflectance at the glass surface was found to be as high as 12.7%.

TABLE 4

| Comp. Ex. No. | Film Composition (wt %) | | |
|---|---|---|---|
| | $SiO_2$ | $TiO_2$ | Au |
| 1 | 0.0 | 84.0 | 16.0 |
| 2 | 16.8 | 67.2 | 16.0 |
| 3 | 36.1 | 47.9 | 16.0 |

TABLE 5

| Comp. Ex. No. | Ya (%) | Tg (%) | Transmitted Light Color | Chromaticity and Lightness of Transmitted Light (a/b/L) | Reflectance at Glass Surface Side (%) |
|---|---|---|---|---|---|
| 1 | 54.7 | 62.3 | blue | −8.46/−8.30/75.6 | 19.1 |
| 2 | 52.3 | 63.5 | blue | −6.55/−16.19/74.5 | 14.7 |
| 3 | 61.0 | 69.5 | purple | 0.80/−11.49/78.9 | 12.7 |

TABLE 6

| Comp. Ex. No. | Chromaticity and Lightness of Reflected Light at Glass Surface Side (a/b/L) | Reflectance at Film Surface Side (%) | Chromaticity and Lightness of Reflected Light at Film Surface Side (a/b/L) |
|---|---|---|---|
| 1 | 1.04/−3.68/43.8 | 21.86 | 2.51/−2.11/46.6 |
| 2 | 3.74/6.79/37.42 | 18.51 | 0.81/8.89/42.2 |
| 3 | 3.72/3.30/34.9 | 16.39 | 2.64/6.23/39.7 |

EXAMPLES 5~35

Five types of substrates A~E were provided as a glass substrate.

Substrate A: a green glass substrate having a thickness of 4.9 mm and a size of 10 cm×10 cm (glass composition (wt %); $SiO_2$=71.0, $Al_2O_3$=1.53, $Fe_2O_3$=0.52, CaO=8.62, MgO=4.06, $Na_2O$=12.3, $K_2O$=0.76, refractive index=1.51, luminous transmittance, Ya, =76.0%, sunlight transmittance, Tg, =51.6%, UV transmittance (Tuv (ISO))=24.3%, visible light reflectance, Rg, =6.9%, transmitted light color=green, and transmitted light chromaticity of a=−6.5 and b=0.5, main wavelength of transmitted light (C light source)=500 nm, transmitted light excitation purity, Pe, (C light source)= 2.49%, and reflected light chromaticity of a=−1.7 and b=−0.7 when expressed by the chromaticity of the Lab color system).

Substrate B: a green glass substrate having a thickness of 3.91 mm and a size of 10 cm×10 cm (glass composition (wt %); $SiO_2$=70.4, $Al_2O_3$=1.5, all iron components (as $Fe_2O_3$)= 0.62 (in which FeO=0.185), $CeO_2$=1.67, $TiO_2$=0.14, CaO= 8.0, MgO=4.0, $Na_2O$=13.0, $K_2O$=0.70, refractive index= 1.51, luminous transmittance, Ya=71.6%, sunlight transmittance, Tg, =44.7%, UV transmittance (T370 nm)= 27.5%, UV transmittance (Tuv (ISO))=8.9%, visible light reflectance, Rg=6.6%, transmitted light color=green, and transmitted light chromaticity of a=−8.0 and b=3.4, main wavelength of transmitted light (C light source)=522 nm, transmitted light excitation purity, Pe, (C light source)= 2.29%, and reflected light chromaticity of a=−1.9 and b=−0.3 when expressed by the chromaticity of the Lab color system).

Substrate C: a green glass substrate having a thickness of 4.80 mm and a size of 10 cm×10 cm (glass composition (wt %); $SiO_2$=70.4, $Al_2O_3$=1.5, all iron components (as $Fe_2O_3$)= 0.55 (in which FeO=0.140), $CeO_2$=1.67, $TiO_2$=0.14, CaO= 8.0, MgO=4.0, $Na_2O$=13.0, $K_2O$=0.70, refractive index= 1.51, luminous transmittance, Ya, =71.9%, sunlight transmittance, Tg, =44.9%, UV transmittance (Tuv (ISO))= 8.3%, visible light reflectance, Rg, =6.6%, transmitted light color=green, and transmitted light chromaticity of a=−8.2 and b=3.4, main wavelength of transmitted light (C light source) =523 nm, transmitted light excitation purity (C light source)=2.45%, and reflected light chromaticity of a=−1.9 and b=−0.3 when expressed by the chromaticity of the Lab color system).

Substrate D: a green glass substrate having a thickness of 3.53 mm and a size of 10 cm×10 cm (glass composition (wt %); $SiO_2$=70.4, $Al_2O_3$=1.5, all iron components (as $Fe_2O_3$)= 0.62 (in which FeO=0.185), $CeO_2$=1.67, $TiO_2$=0.14, CaO= 8.0, MgO=4.0, $Na_2O$=13.0, $K_2O$=0.70, refractive index= 1.51, luminous transmittance, Ya, =73.5%, sunlight transmittance, Tg, =48.5%, UV transmittance (Tuv (ISO))= 9.7%, visible light reflectance, Rg, =7.0%, transmitted light color=green, and transmitted light chromaticity of a=−7.2 and b=3.0, main wavelength of transmitted light (C light source)=524 nm, transmitted light excitation purity, Pe, (C light source)=2.11%, and reflected light chromaticity of a=−2.4 and b=−0.1 when expressed by the chromaticity of the Lab color system).

Substrate E: a green glass substrate having a thickness of 3.91 mm and a size of 10 cm×10 cm (glass composition (wt %); $Si_2$=70.7, $Al_2O_3$=1.5, all iron components (as $Fe_2O_3$)= 0.45 (in which FeO=0.048), $CeO_2$=1.57, $TiO_2$=0.12, CoO= 0.0020, Se=0.0011, CaO=8.0, MgO=4.0, $Na_2O$=13.0, $K_2O$= 0.70, refractive index=1.51, luminous transmittance, Ya, =74.6%, sunlight transmittance, Tg, =69.1%, WV transmittance (Tuv (ISO))=10.8%, visible light reflectance, Rg, =6.8%, transmitted light color=green, and transmitted light chromaticity of a=0.15 and b=6.14, main wavelength of transmitted light (C light source)=598 nm, transmitted light excitation purity (C light source)=6.75%, and reflected light chromaticity of a=−0.0 and b=−0.8 when expressed by the chromaticity of the Lab color system).

The silicon oxide stock solution prepared in Example 1 was weighed in amounts indicated in Table 7, to which ethyl cellosolve (EC) was added in amounts indicated in Table 7. Thereafter, the adduct of trimethylolpropane acrylate and (ethylene oxide)$_6$ (EO6) was added in amounts indicated in Table 7, followed by final addition of the chloroauric acid stock solution prepared in Example 1 in amounts indicated in Table 7 and mixing under agitation to prepare coating solutions. Each coating solution was spin coated onto a substrate indicated in Table 7 at a frequency indicated in Table 7 for 15 seconds. After drying in air, the coated substrate was thermally treated at 250° C. for 2 hours, thereby causing fine particles of gold to be deposited, followed by calcination at 720° C. for 110 seconds to obtain a color film-bearing glass plate. The composition, refractive index and thickness of individual colored films and the visible light transmittance, visible light reflectance, color (transmitted light) and the like characteristics of individual glass plates are shown in Tables 8~10. Although not particularly shown in the tables, the colored film-bearing glass plates of Examples 25~35 wherein substrates B, C, D and E, respectively, had a UV transmittance (Tuv(ISO)) which was substantially equal to those of corresponding substrates and was 10% or below.

The respective colored films showed good results with respect to the chemical resistance and the abrasion resistance. The main wavelengths (C light source) of the light transmitted through the colored film-bearing glass plates of Examples 14, 15 were, respectively, 481 nm and 495 nm, with the transmitted light excitation purity (C light source) being, respectively, 0.19% and 1.30%.

EXAMPLE 36

A green glass substrate F (whose glass composition was the same as the substrate A used in Examples 5~22) having a thickness of 2.3 mm and a size of 10 cm×10 cm was provided.

2.5 g of the silicon oxide stock solution prepared in Example 1 was weighed, to which 5.85 g of ethyl cellosolve was added, followed by further addition of 0.15 g of the adduct of trimethylolpropane acrylate. (ethylene oxide) 6, followed by final addition of 1.3 g of the chloroaulic acid stock solution prepared in Example 1 and mixing under agitation to prepare a coating solution. The coating solution was spin coated onto the green glass substrate at a frequency of 1500 rpm for 15 seconds. After drying in air, the coated substrate was thermally treated at 250° C. for 2 hours, thereby causing fine particles of gold to be deposited. The substrate was then placed in a heating furnace wherein it was heated up to 610° C. in 2 hours and maintained at the temperature for 10 minutes. Subsequently, the substrate was naturally cooled to obtain a colored film-bearing glass plate F1. The plate F1 and glass substrate F were superposed through a 0.8 mm thick polyvinylbutyral intermediate film so that the colored film was turned inside, followed by hot pressing in an autoclave at 250° C. for 15 minutes to obtain a laminated glass plate having the colored film as an intermediate layer.

The composition, refractive index and thickness of the colored film, and the visible light transmittance, visible light reflectance, color (transmitted light) and the like characteristics of the glass plate are shown in Tables 8~10. In Tables 9, 10, the reflectance and reflected light chromaticity of the "glass surface", respectively, mean measurements determined from the outer surface side of the colored film-bearing glass plate F1 of the laminated plate, and the reflectance and the reflected light chromaticity of the "film surface" mean measurements determined from the other surface of the laminated glass plate, i.e. the outer surface side of the colored film-free glass plate F.

The laminated glass plate made by use of two colored film-free green glass substrates F had a luminous transmittance, Ya, =78.5%, a sunlight transmittance, Tg, =52.1%, a TV transmittance (Tuv(ISO))=0.04%, a green transmitted light color, a transmitted light chromaticity of a=−6.3 and b=1.73, a main wavelength of transmitted light (C light source)=509 nm, and a transmitted light excitation purity (C light source)=1.84% when expressed by the chromaticity of the Lab color system.

TABLE 7

| Example No. | Silicon Oxide Stock Solution | EO6 (g) | EC (g) | Chloroauric Acid Stock Solution (g) | Spinning Conditions (rpm) | Substrate |
|---|---|---|---|---|---|---|
| 5 | 2.5 | 0.1 | 5.9 | 1.5 | 1000 | A |
| 6 | 2.5 | 0.1 | 5.9 | 1.5 | 2000 | A |
| 7 | 2.5 | 0.1 | 5.9 | 1.5 | 3000 | A |
| 8 | 2.5 | 0.15 | 5.85 | 1.5 | 1000 | A |
| 9 | 2.5 | 0.15 | 5.85 | 1.5 | 2000 | A |
| 10 | 2.5 | 0.15 | 5.85 | 1.5 | 3000 | A |
| 11 | 2.5 | 0.1 | 5.9 | 1.3 | 1000 | A |
| 12 | 2.5 | 0.1 | 5.9 | 1.5 | 2000 | A |
| 13 | 2.5 | 0.1 | 5.9 | 1.5 | 3000 | A |
| 14 | 2.5 | 0.15 | 5.85 | 1.3 | 1000 | A |
| 15 | 2.5 | 0.15 | 5.85 | 1.3 | 2000 | A |
| 16 | 2.5 | 0.15 | 5.85 | 1.3 | 3000 | A |
| 17 | 2.5 | 0.1 | 5.9 | 1.0 | 1000 | A |
| 18 | 2.5 | 0.1 | 5.9 | 1.0 | 2000 | A |
| 19 | 2.5 | 0.1 | 5.9 | 1.0 | 3000 | A |
| 20 | 2.5 | 0.15 | 5.85 | 1.0 | 1000 | A |
| 21 | 2.5 | 0.15 | 5.85 | 1.0 | 2000 | A |
| 22 | 2.5 | 0.15 | 5.85 | 1.0 | 3000 | A |
| 23 | 2.5 | 0.1 | 5.9 | 1.5 | 1000 | B |
| 24 | 2.5 | 0.1 | 5.9 | 1.5 | 2000 | B |
| 25 | 2.5 | 0.15 | 5.85 | 1.5 | 1000 | B |
| 26 | 2.5 | 0.15 | 5.85 | 1.5 | 2000 | B |
| 27 | 2.5 | 0.1 | 5.9 | 1.5 | 2000 | C |

TABLE 7-continued

| Example No. | Silicon Oxide Stock Solution | EO6 (g) | EC (g) | Chloroauric Acid Stock Solution (g) | Spinning Conditions (rpm) | Substrate |
|---|---|---|---|---|---|---|
| 28 | 2.5 | 0.15 | 5.85 | 1.5 | 1000 | C |
| 29 | 2.5 | 0.15 | 5.85 | 1.5 | 2000 | C |
| 30 | 2.5 | 0.1 | 5.9 | 1.5 | 1000 | D |
| 31 | 2.5 | 0.1 | 5.9 | 1.5 | 2000 | D |
| 32 | 2.5 | 0.15 | 5.85 | 1.5 | 1000 | D |
| 33 | 2.5 | 0.1 | 5.9 | 1.5 | 1000 | E |
| 34 | 2.5 | 0.1 | 5.9 | 1.5 | 2000 | E |
| 35 | 2.5 | 0.15 | 5.85 | 1.5 | 1000 | E |
| 36 | 2.5 | 0.15 | 5.85 | 1.3 | 1500 | F |

TABLE 8

| Example No. | Film | Film Composition (wt %) SiO2 | TiO2 | Au | Refractive Index | Thickness (nm) |
|---|---|---|---|---|---|---|
| 5 | Colored Film | 87.5 | 0.0 | 12.5 | 1.48 | 140 |
| 6 | Colored Film | 87.5 | 0.0 | 12.5 | 1.48 | 110 |
| 7 | Colored Film | 87.5 | 0.0 | 12.5 | 1.48 | 80 |
| 8 | Colored Film | 87.5 | 0.0 | 12.5 | 1.48 | 140 |
| 9 | Colored Film | 87.5 | 0.0 | 12.5 | 1.48 | 110 |
| 10 | Colored Film | 87.5 | 0.0 | 12.5 | 1.48 | 80 |
| 11 | Colored Film | 89.0 | 0.0 | 11.0 | 1.48 | 140 |
| 12 | Colored Film | 89.0 | 0.0 | 11.0 | 1.48 | 110 |
| 13 | Colored Film | 89.0 | 0.0 | 11.0 | 1.48 | 80 |
| 14 | Colored Film | 89.0 | 0.0 | 11.0 | 1.48 | 140 |
| 15 | Colored Film | 89.0 | 0.0 | 11.0 | 1.48 | 110 |
| 16 | Colored Film | 89.0 | 0.0 | 11.0 | 1.48 | 80 |
| 17 | Colored Film | 91.3 | 0.0 | 8.7 | 1.48 | 140 |
| 18 | Colored Film | 91.3 | 0.0 | 8.7 | 1.48 | 110 |
| 19 | Colored Film | 91.3 | 0.0 | 8.7 | 1.48 | 80 |
| 20 | Colored Film | 91.3 | 0.0 | 8.7 | 1.48 | 140 |
| 21 | Colored Film | 91.3 | 0.0 | 8.7 | 1.48 | 110 |
| 22 | Colored Film | 91.3 | 0.0 | 8.7 | 1.48 | 80 |
| 23 | Colored Film | 87.5 | 0.0 | 12.5 | 1.48 | 140 |
| 24 | Colored Film | 87.5 | 0.0 | 12.5 | 1.48 | 110 |
| 25 | Colored Film | 87.5 | 0.0 | 12.5 | 1.48 | 140 |
| 26 | Colored Film | 87.5 | 0.0 | 12.5 | 1.48 | 110 |
| 27 | Colored Film | 87.5 | 0.0 | 12.5 | 1.48 | 110 |
| 28 | Colored Film | 87.5 | 0.0 | 12.5 | 1.48 | 140 |
| 29 | Colored Film | 87.5 | 0.0 | 12.5 | 1.48 | 110 |
| 30 | Colored Film | 87.5 | 0.0 | 12.5 | 1.48 | 140 |
| 31 | Colored Film | 87.5 | 0.0 | 12.5 | 1.48 | 110 |
| 32 | Colored Film | 87.5 | 0.0 | 12.5 | 1.48 | 140 |
| 33 | Colored Film | 87.5 | 0.0 | 12.5 | 1.48 | 140 |
| 34 | Colored Film | 87.5 | 0.0 | 12.5 | 1.48 | 110 |
| 35 | Colored Film | 87.5 | 0.0 | 12.5 | 1.48 | 140 |
| 36 | Colored Film | 89.0 | 0.0 | 11.0 | 1.48 | 120 |

TABLE 9

| Example No. | Ya (%) | Tg (%) | Transmitted Light Color | Lightness of Transmitted Light (a/b/L) | Reflectance at Glass Surface Side (%) |
|---|---|---|---|---|---|
| 5 | 69.1 | 49.3 | grey | −0.41/−0.09/83.2 | 7.26 |
| 6 | 70.1 | 49.7 | grey | −0.75/0.31/83.8 | 6.99 |
| 7 | 70.8 | 50.1 | grey | −1.53/−0.07/84.4 | 7.11 |
| 8 | 65.1 | 48.2 | reddish purple | 3.45/−2.15/80.5 | 6.46 |
| 9 | 69.2 | 49.7 | grey | 0.1/−0.97/83.3 | 7.23 |
| 10 | 70.6 | 50.3 | grey | −1.05/−0.88/84.3 | 7.14 |
| 11 | 70.8 | 50.4 | grey | −2.58/0.46/85.8 | 6.64 |
| 12 | 73.2 | 51.2 | grey | | |
| 13 | 74.4 | 51.7 | green grey | −3.44/0.38/86.7 | 6.40 |
| 14 | 70.2 | 50.2 | grey | −0.07/−0.16/83.8 | 6.82 |
| 15 | 73.1 | 51.4 | grey | −2.39/−0.15/85.9 | 6.84 |
| 16 | 73.9 | 51.6 | grey | −2.97/−0.08/86.3 | 6.47 |
| 17 | 72.2 | 50.9 | grey | −1.75/0.57/85.2 | 5.69 |
| 18 | 74.5 | 51.7 | green grey | −3.3/0.53/86.7 | 6.24 |
| 19 | 75.2 | 52.1 | green grey | −3.89/0.46/87.2 | 6.24 |
| 20 | 72.2 | 50.9 | grey | −1.46/0.27/85.1 | 6.76 |
| 21 | 74.2 | 51.8 | grey | −3.2/0.09/86.6 | 6.47 |
| 22 | 75.0 | 52.1 | green grey | −3.91/0.06/87.1 | 6.22 |
| 23 | 64.6 | 43.8 | grey | −1.69/1.69/80.5 | 6.76 |
| 24 | 68.9 | 45.3 | green grey | −5.03/1.91/83.5 | 6.28 |
| 25 | 63.4 | 43.8 | grey | −0.04/0.08/79.7 | 7.10 |
| 26 | 66.7 | 44.9 | grey | −2.93/0.76/82.0 | 6.74 |
| 27 | 66.4 | 46.6 | grey | −1.14/0.86/81.6 | 7.10 |
| 28 | 62.7 | 45.4 | grey | 1.69/−0.32/79.0 | 7.15 |
| 29 | 66.7 | 46.7 | grey | −1.72/0.73/81.8 | 7.04 |
| 30 | 64.2 | 45.1 | grey | −0.4/1.53/80.1 | 6.98 |
| 31 | 67.3 | 46.3 | grey | −2.97/1.5/82.3 | 6.65 |
| 32 | 62.3 | 44.3 | grey | 0.89/−0.01/78.9 | 7.00 |
| 33 | 61.3 | 62.0 | reddish orange | 6.38/6.27/61.3 | 6.58 |
| 34 | 64.0 | 62.8 | reddish orange | 4.46/6.47/79.0 | 6.27 |
| 35 | 59.0 | 61.5 | reddish orange | 8.54/4.76/75.4 | 6.65 |
| 36 | 73.6 | 52.2 | grey | −1.07/0.59/85.9 | 6.46 |
| 37 | 61.1 | 42.3 | grey | −2.77/0.32/78.5 | 8.95 |
| 38 | 63.7 | 43.2 | green grey | −4.34/1.62/80.2 | 8.48 |

TABLE 10

| Example No. | Chromaticity and Lightness of Reflected Light at Glass Surface Side (a/b/L) | Reflectance at Film Surface Side (%) | Chromaticity and Lightness of Reflected Light at Film Surface Side (a/b/L) |
|---|---|---|---|
| 5 | −1.07/0.37/27.1 | 6.38 | 1.75/0.46/25.0 |
| 6 | −1.13/−0.01/26.6 | 6.01 | 1.33/0.34/24.3 |
| 7 | −0.82/0.36/26.7 | 6.53 | 0.51/1.59/25.4 |
| 8 | −0.69/−0.06/25.5 | 5.31 | 1.07/−2.48/23.1 |
| 9 | −1.38/0.37/27.1 | 5.68 | 2.98/−0.93/23.6 |
| 10 | −0.79/0.49/26.8 | 6.18 | 1.79/1.04/24.6 |
| 11 | −1.38/−0.11/26.3 | 5.92 | 1.18/−1.05/24.3 |
| 12 | −0.91/−0.15/25.9 | 5.88 | 0.11/0.82/24.2 |
| 13 | −0.46/0.11/25.3 | 6.17 | −1.00/1.54/24.9 |
| 14 | −1.54/−0.12/26.3 | 5.48 | 2.05/−2.01/23.3 |
| 15 | −0.89/0.1/26.3 | 6.05 | 0.72/1.1/24.4 |
| 16 | −0.32/0.21/25.5 | 6.21 | −0.55/1.81/24.8 |
| 17 | −1.51/0.06/25.5 | 5.07 | 0.73/−1.56/22.6 |
| 18 | −0.82/−0.4/25.1 | 5.71 | −0.02/0.2/23.9 |
| 19 | −0.51/−0.1/25.0 | 5.81 | −0.81/0.92/24.1 |
| 20 | −1.68/0.41/26.2 | 5.30 | 1.01/−2.25/23.1 |
| 21 | −0.85/0.22/25.6 | 5.60 | 0.41/0.32/23.6 |
| 22 | −0.44/0.0/25.0 | 5.91 | −0.57/1.24/24.3 |
| 23 | −0.99/0.06/26.1 | 6.17 | 0.55/−0.03/24.8 |
| 24 | −0.43/0.08/25.1 | 6.16 | −1.13/1.78/24.8 |
| 25 | −1.43/0.53/26.8 | 5.59 | 3.14/−0.94/23.3 |
| 26 | −0.34/0.54/26.0 | 6.30 | 0.59/2.34/24.9 |
| 27 | −0.59/0.95/26.7 | 6.35 | 1.58/2.64/24.8 |
| 28 | −1.6/0.92/26.9 | 5.18 | 4.08/−2.22/22.5 |
| 29 | −0.82/0.88/26.6 | 5.78 | 2.88/0.87/23.6 |
| 30 | −1.04/0.48/26.5 | 6.05 | 1.9/0.3/24.4 |
| 31 | −0.37/0.55/25.8 | 6.68 | −0.73/2.74/25.7 |
| 32 | −1.37/0.66/26.6 | 5.33 | 3.6/−1.39/22.8 |
| 33 | 0.49/1.22/25.5 | 5.71 | 3.24/1.19/23.4 |
| 34 | 0.96/1.15/24.8 | 6.24 | 0.76/3.55/24.6 |
| 35 | 0.42/1.51/25.6 | 4.88 | 5.24/−0.05/21.5 |
| 36 | −0.38/−0.22/26.3 | 6.12 | 0.72/0.63/25.4 |
| 37 | −1.48/2.10/29.9 | 9.49 | 1.77/4.03/30.3 |
| 38 | −0.94/0.36/29.2 | 10.50 | −0.60/1.63/32.3 |

EXAMPLES 37, 38

3 moles of acetylacetone was added to 1 mole of cerium nitrate hexahydrate and heated to 90° C. under agitation under which the mixture was treated for 1 hour. The solution was provided as cerium nitrate stock solution. This had a $CeO_2$ solid content of 23.2%.

2 moles of acetylacetone was dropped in 1 mole of agitated titanium isopropoxide by means of a dropping funnel. This solution was used as titanium oxide stock solution. This had a $TiO_2$ solid content of 16.5%.

0.41 g of the cerium nitrate stock solution, 0.39 g of the titanium oxide stock solution and 1.70 g of the silicon oxide stock solution prepared in Example 1 were, respectively, weighed, to which 6.00 g of ethyl cellosolve (solvent) was added, followed by final addition of 1.50 g of the chloroauric acid stock solution prepared in Example 1 and mixing under agitation to obtain a coating solution.

The thus obtained coating solution was spin coated onto a green substrate B at 1000 rpm (Example 37) or at 2000 rpm (Example 38) for 15 seconds. After drying in air, the substrate was thermally treated at 250° C. for 2 hours to cause fine particles of gold to be deposited. Further, calcination at 720° C. was effected for 110 seconds to obtain a glass plate having a colored film. The coating composition and conditions are shown in Table 11, the composition and refractive index of the colored film are shown in Table 12, the visible light transmittance, visible light reflectance, color (transmitted light) and the like characteristics of the colored film are shown in Tables 9~10. The colored film showed good results with respect to chemical and abrasion resistance.

silicate composition prepared by a floating method. After drying in air, the substrate was thermally treated at 250° C. for 2 hours to cause fine particles of gold to be deposited. Further, calcination was effected at 720° C. for 120 seconds to obtain a colored film-bearing glass plate. The visible light transmittance, visible light reflectance, color and the like characteristics of the colored film are shown in Tables 13~15. The colored film showed good results with respect to chemical resistance and abrasion resistance.

EXAMPLE 40

The coating solution used in Example 39 was spin coated, at a frequency of 1000 rpm for 10 seconds, onto a UV-cutting, green glass substrate having a thickness of 3.4 mm and a size of 10 cm×10 cm (glass composition (wt %); $SiO_2$=70.4, $Al_2O_3$=1.5, all iron components (as $Fe_2O_3$)=0.62 (in which FeO=0.185), $CeO_2$=1.67, $TiO_2$=0.14, CaO=8.0, MgO=4.0, $Na_2O$=13.0, $K_2O$=0.70, refractive index=1.51, luminous transmittance, Ya, =73.1%, sunlight transmittance, Tg, =48.9%, visible light reflectance, rg, =6.6%, UV transmittance (Tuv (ISO))=9.7%, transmitted light color=green, transmitted light chromaticity of a=−7.1, b=2.8 and L=86, and reflected light chromaticity of a=−1.7 and b=−0.1 when expressed by the chromaticity of the Lab color system, main wavelength of transmitted light (C light source)=524 nm, and transmitted light excitation purity, Pe, (C light source)= 2.09%). After drying in air, it was thermally treated at 250° C. for 2 hours to cause fine particles of gold to be deposited, followed by calcination at 720° C. for 120 seconds, thereby obtaining a glass plate bearing a colored film thereon. The visible light transmittance, the visible light reflectance, the color (transmitted light), and the like characteristics of the colored film-bearing glass plate are shown in Tables 13~15. The resultant colored film showed good results with respect to chemical resistance and abrasion resistance.

TABLE 11

| Example | Silicon Oxide Stock Solution (g) | $TiO_2$ Stock Solution (g) | $CeO_2$ Stock Solution (g) | Solvent (g) | Chloroauric Acid Stock Solution (g) | Spinning Conditions (rpm) | Substrate |
|---|---|---|---|---|---|---|---|
| 37 | 1.70 | 0.39 | 0.41 | 6.0 | 1.5 | 1000 | B |
| 38 | 1.70 | 0.39 | 0.41 | 6.0 | 1.5 | 2000 | B |

TABLE 12

| Example No. | Film Composition (wt %) | | | | Refractive Index | Film Thickness (nm) |
|---|---|---|---|---|---|---|
| | $SiO_2$ | $TiO_2$ | $CeO_2$ | Au | | |
| 37 | 59.4 | 11.3 | 16.8 | 12.5 | 1.59 | 130 |
| 38 | 59.4 | 11.3 | 16.8 | 12.5 | 1.59 | 100 |

EXAMPLE 39

2.97 g of the silicon oxide stock solution prepared in Example 1 was weighed, to which 5.44 g of ethyl cellosolve was added, followed by final addition of 2.0 g of the chloroauric acid stock solution prepared in Example 1 and mixing under agitation to prepare a coating solution.

The thus prepared coating solution was spin coated, at a frequency of 1000 rpm for 15 seconds, onto a colorless transparent glass substrate which had a thickness of 3.4 mm and a size of 10 cm×10 cm and was made of a soda lime The comparison between Examples 39 and 40 reveals that although the colored films are similar to each other, the transmitted light color of the colored film-bearing glass plate (Example 39) using the colorless, transparent glass plate as the substrate was pink (i.e. when expressed in terms of the chromaticity of the Lab color system, the transmitted light chromaticity was such that a=9.3 and b=−0.4, which is substantially equal to the transmitted light chromaticity of the colored film). Where the green colored transparent glass substrate (with a transmitted light chromaticity of a=−7.1 and b=2.8 when expressed by the chromaticity of the Lab color system) is used as the substrate, the transmitted light color of the colored film-bearing glass plate (Example 40) is gray (i.e. a transmitted light chromaticity of a=0.1 and b=0.5 when expressed by the chromaticity of the Lab color system) whose chromaticity is substantially equal to an average value of the transmitted light chromaticity of the colored film and the transmitted light chromaticity of the green colored, transparent glass substrate.

TABLE 13

| Example No. | Film Composition (wt %) | | | Refractive Index | Film Thickness (nm) |
| --- | --- | --- | --- | --- | --- |
| | SiO₂ | TiO₂ | Au | | |
| 39 | 83.9 | 0.0 | 16.1 | 1.48 | 90 nm |
| 40 | 83.9 | 0.0 | 16.1 | 1.48 | 87 nm |

TABLE 14

| Example No. | Ya (%) | Transmitted Light Color | Chromaticity and Lightness of And Transmitted Light (a/b/L) | Reflectance at Glass Surface Side (%) |
| --- | --- | --- | --- | --- |
| 39 | 74.0 | pink | 9.3/−4.0/85.2 | 8.6 |
| 40 | 64.3 | neutral gray | 0.1/0.5/80.2 | 6.7 |

TABLE 15

| Example No. | Chromaticity and Lightness of Reflected Light at Glass Surface Side (a/b/L) | Reflectance at Film Surface Side (%) | Chromaticity and Lightness of Reflected Light at Film Surface Side (a/b/L) |
| --- | --- | --- | --- |
| 39 | −1.7/1.3/29.0 | 7.8 | 4.4/1.5/27.3 |
| 40 | −0.8/1.0/26.0 | 6.2 | 1.9/1.7/24.6 |

INDUSTRIAL FIELD OF UTILITY

According to the invention, there can be obtained glass articles having a colored film which is colored in gray, grayish green, or red-reddish purple and whose visible light reflectance is 10.0% or below, preferably 9.0% or below. The colored film-bearing glass articles of the invention are usable as a window or a mirror such as for vehicles or buildings.

What is claimed is:

1. A colored film-covered glass article which comprises a glass substrate sheet and, covering one surface thereof, a colored film which comprises:
   silicon oxide greater than 50 to 95 wt. %;
   at least one member selected from the group consisting of zirconium oxide, tantalum oxide and titanium oxide 0–30 wt. %;
   cerium oxide 0–25 wt. %;
   gold as coloring particles 5–20 wt. %,
   wherein the colored film has a thickness of 50 nm to 180 nm and a visible light reflectance, both at the one surface and at a second surface of the glass substrate sheet opposite the one surface, which is 10.0% or below.

2. A colored film-covered glass laminate which comprises: a glass substrate sheet and, covering one surface thereof, a colored film which comprises:
   silicon oxide greater than 50 to 95 wt. %;
   at least one member selected from the group consisting of zirconium oxide, tantalum oxide and titanium oxide 0–30 wt. %;
   cerium oxide 0–25 wt. %;
   gold as coloring particles 5–20 wt. %;
   the colored film having a thickness of 50 nm to 180 nm; and a glass plate laminated to the colored film-covered one surface of the glass substrate sheet, the glass laminate having a visible light reflectance of 10.0% or below.

3. A colored film-covered glass article according to claim 1, wherein said colored film comprises:
   silicon oxide 55–93 wt. %;
   at least one member selected from the group consisting of zirconium oxide, tantalum oxide and titanium oxide 0–15 wt. %;
   cerium oxide 0–20 wt. %;
   gold as coloring particles 7–17 wt %.

4. A colored film-covered glass article according to claim 1, wherein said glass article has transmitted light color expressed by a chromaticity of a=−5.0~10 and b=−15~6.0 and a lightness, L, =20~90 when expressed by the Lab color system.

5. A colored film-covered glass article according to claim 4, wherein said glass article has transmitted light color expressed by a chromaticity of a=−5.0~30 and b=−5.0~3.0 and a lightness, L, =40~90 when expressed by the Lab color system.

6. A colored film-covered glass article according to claim 5, wherein said glass article has transmitted light color expressed by a chromaticity of a=−3.0~3.0 and b=−3.0~3.0 and a lightness, L, =50~90 when expressed by the Lab color system.

7. A colored film-covered glass article according to claim 1, wherein said glass article has a sunlight transmittance of 55% or below.

8. A colored film-covered glass article according to claim 1, wherein said glass article has a UV transmittance (Tuv (ISO)) of 12% or below.

9. A colored film-covered glass article according to claim 1, wherein said glass substrate sheet has a thickness of 1.5~5.5 mm, a transmitted light chromaticity of a value of a of −10.0~−2.0 and a value of b of −4.0~4.0 when expressed by the Lab color system, a UV transmittance (at a wavelength of 370 nm) of 10~70%, a visible light transmittance of 40~85%, and a sunlight transmittance of 20~80%.

10. A colored film-covered glass article according to claim 9, wherein said glass substrate sheet has a transmitted light color expressed by chromaticity of a=−10.0~−4.0 and b=−1.0~4.0 when expressed by the Lab color system.

11. A colored film-covered glass article according to claim 9, wherein said glass substrate has a UV light transmittance (Tuv(ISO)) of 15% or below.

12. A colored film-covered glass article according to claim 2, wherein said glass substrate sheet and said glass plate, respectively, have a thickness of 1.5 mm~2.5 mm, and a laminate of said glass substrate sheet not covered with the colored film and said glass plate has a transmitted light chromaticity of a value of a of −10.0~−2.0 and a value of b of −4.0~4.0 when expressed by the Lab color system, a UV transmittance (at a wavelength of 370 nm) of 0~70%, a visible light transmittance of 70~85, and a sunlight transmittance of 40~80%.

13. A colored film-covered glass article according to claim 12, wherein said laminate of said substrate sheet not covered with the colored film and said glass plate has a transmitted light chromaticity of a value of a of −10.0~−4.0 and a value of b of −1.0~4.0 when expressed by the Lab color system.

14. A colored film-covered glass article according to claim 12, wherein said laminate of said substrate sheet not covered with the colored film and said glass plate has a UV transmittance (Tuv(ISO)) of 15% or below.

15. A colored film-covered glass article which comprises a colored film comprising:
   silicon oxide 55–93 wt. %; and gold as coloring particles 7–17 wt. %,
and having a thickness of 60–150 um, the colored film being covered on a surface of a glass substrate sheet or on the inner surface of a glass substrate sheet of a laminate with another other glass sheet, and the colored film-covered glass article having a transmitted light color expressed by a chromaticity of a of −3.0–3.0 and b of −3.0–3.0 and a lightness L of 50–90 when expressed by the Lab color system, a UV light transmittance (Tuv(ISO)) of 10% or below, a sunlight transmittance of 55% or below, a visible light reflectance at opposing sides of 10.0% or below, wherein the glass substrate sheet not covered with the colored film or the glass substrate sheet of the laminate has a thickness of 1.5–5.5 mm, a transmitted light chromaticity of a value of a of −10.0–4.0 and a value of b of −1.0–4.0 when expressed by the Lab color system, a UV transmittance at a wavelength of 370 nm of 10–70%, a UV transmittance, expressed as Tuv(ISO), of 15% or below, a visible light transmittance of 40–85%, and a sunlight transmittance of 20–80%.

16. A colored film-covered glass article according to claim 15, wherein said glass article has a reflected light chromaticity of a of −4.0~2.0 and b of −3.0~2.0 when expressed by the Lab color system.

17. A colored film-covered glass article according to claim 1, wherein visible light reflectance at the second surface of the glass substrate is 8% or less.

18. A process for preparation of a colored film-covered glass article which comprises a glass substrate sheet covered on one surface thereof with a colored film which comprises:
  silicon oxide greater than 50 to 95 wt. %;
  at least one member selected from the group consisting of zirconium oxide, tantalum oxide and titanium oxide 0–30 wt. %;
  cerium oxide 0–25 wt. %;
  gold as coloring particles 5–20 wt. %,
wherein the colored film has a thickness of 50 nm to 180 nm and visible light reflectance, at a second surface of the glass substrate sheet, opposite the one surface, no greater than 10.0%, said process comprising:
    coating the one surface of the glass substrate with a solution containing:
      (1) silicon alkoxide;
      (2) chloroauric acid; and
      (3) organic solvent;
  drying the coated glass substrate sheet at 100–400° C.; and then
    thermally treating the dried coating at a temperature above 500° C.

19. A process according to claim 18 wherein the coating solution further contains at least one organic compound selected from the group consisting of organic compounds of zirconium, tantalum and titanium.

20. A process according to claim 18 wherein the coating solution further contains an organic or inorganic compound of cerium.

* * * * *